(12) United States Patent
Norton et al.

(10) Patent No.: US 7,222,431 B1
(45) Date of Patent: May 29, 2007

(54) ALIGNMENT CORRECTION SYSTEM AND METHODS OF USE THEREOF

(75) Inventors: Robert J. Norton, Madison, WI (US); Christopher J. Davis, Waunakee, WI (US)

(73) Assignee: Gilson, Inc., Middleton, WI (US)

( * ) Notice: Subject to any disclaimer, the term of this patent is extended or adjusted under 35 U.S.C. 154(b) by 0 days.

(21) Appl. No.: 11/347,355

(22) Filed: Feb. 3, 2006

(51) Int. Cl.
*G01B 11/27* (2006.01)

(52) U.S. Cl. ............... 33/286; 33/DIG. 21; 33/1 M

(58) Field of Classification Search ........... 33/1 BB, 33/1 M, 286, 293, 559, DIG. 21
See application file for complete search history.

(56) References Cited

U.S. PATENT DOCUMENTS

| | | | |
|---|---|---|---|
| 4,790,651 A | 12/1988 | Brown et al. | |
| 5,463,215 A | 10/1995 | Alfille | |
| 5,745,308 A | 4/1998 | Spangenberg | |
| 5,829,151 A * | 11/1998 | Collier et al. | 33/1 M |
| 5,920,394 A | 7/1999 | Gelbart et al. | |
| 5,973,842 A | 10/1999 | Spangenberg | |
| 6,042,249 A | 3/2000 | Spangenberg | |
| 6,266,891 B1 * | 7/2001 | Yamamoto | 33/286 |
| 6,519,860 B1 | 2/2003 | Bieg et al. | |
| 6,748,790 B2 | 6/2004 | Abbe | |
| 2001/0013177 A1 * | 8/2001 | Jacobs et al. | 33/1 M |
| 2002/0162233 A1 * | 11/2002 | El-Katcha et al. | 33/293 |
| 2004/0261278 A1 * | 12/2004 | Bodgren et al. | 33/286 |
| 2006/0207115 A1 * | 9/2006 | Truche et al. | 33/286 |

* cited by examiner

*Primary Examiner*—G. Bradley Bennett
(74) *Attorney, Agent, or Firm*—Foley & Lardner LLP

(57) ABSTRACT

Cartesian robots and methods for proper alignment are provided. More specifically, the invention uses reflective spheres and a laser to locate specific points that can then be used to determine correction factors.

27 Claims, 7 Drawing Sheets

ALIGNMENT CORRECTION SYSTEM AND METHODS OF USE THEREOF

FIELD OF THE INVENTION

This invention is related to Cartesian robots and methods for proper alignment. More specifically, the invention uses light-reflective spheres and a laser to locate specific points that can then be used to determine correction factors.

BACKGROUND OF THE INVENTION

Cartesian robots, as manufactured, typically have three primary sources of correctable error in their movement to target locations. The first is an offset error, a displacement in X or Y that does not vary over the area of the bed. The second error component is scale inaccuracy, where a commanded movement systematically results in more or less movement than requested. The third source of error is skew, when a requested movement in X creates an unintended movement in Y, or a requested movement in Y creates an unintended movement in X.

These three errors, offset, scale inaccuracy, and skew are machine specific errors and cannot be preset for all robots manufactured. For each machine manufactured, each of the errors must be determined and correction factors set. The correction factors must also be redetermined and reset occasionally due to a number of events including routine operation, the machine being moved or bumped, or as part of a regular maintenance schedule.

Because of the need to set the correction factors for each machine, a simple and reliable alignment correction system and method of determining those factors is desirable. We hereby provide such a system and method.

SUMMARY

In one aspect the invention relates to an alignment correction system. The correction system comprises a light source and sensor, or probe, that are positionable in a probe plane, the probe plane being substantially parallel to a plane containing the base, or bed, of the correction system. Typically, the light source and sensor are located on an actuated arm of a Cartesian robot, or X-Y plotter. The light source may be any light source including, but not limited to, laser light sources. The base comprises a surface with target locations lying substantially within a single plane, with each target location being fitted to receive a light-reflective object. In some embodiments of the present invention, the light-reflective object is a light-reflective sphere. The base may have a single target location, two target locations, three target locations, or more depending upon the number of locations necessary to accurately correct for the errors. In addition, one or more light-reflective objects may each be positioned at one of the target locations. The probe plane should be located at a distance from the base plane such that the probe can illuminate each target location with a beam of light and the sensor can detect reflected light from any light-reflective object located at such a target location. The light-reflective objects allow for the light and sensor to detect a specific point. In the case where the light-reflective object is a light reflective sphere, the specific point is the apex of the curvature of the sphere. Once the position of one or more of the objects is located, those located positions may be used to calculate correction factors to adjust for the three primary sources of error inherent in any Cartesian robot or X-Y plotter system. The invention also provides a method of correcting alignment errors using the above-described system by illuminating one or more of the light-reflective objects with the beam of light from the probe, and detecting the light reflected from the objects with a sensor on the probe. Alignment error may then be calculated from the reflected light detected.

In another aspect, the invention provides for a method of correcting alignment errors in a machine comprising (1) positioning the probe of the alignment correction system over one of the light-reflective objects at one of the target locations, (2) illuminating the light-reflective object with a beam of light from the probe light source, (3) detecting the light reflected from the light-reflective object with the probe sensor, (4) repositioning the probe relative to the light-reflective object until the reflected light is at a maximum and recording the position of the probe at the maximum, (5) repeating the above steps for each target location having a light-reflective object thereat, and determining the alignment error from the data gathered in step 4. The alignment error determined by the method may be one or more of offset error, scale inaccuracy, or skew.

DETAILED DESCRIPTION

Figure 1:
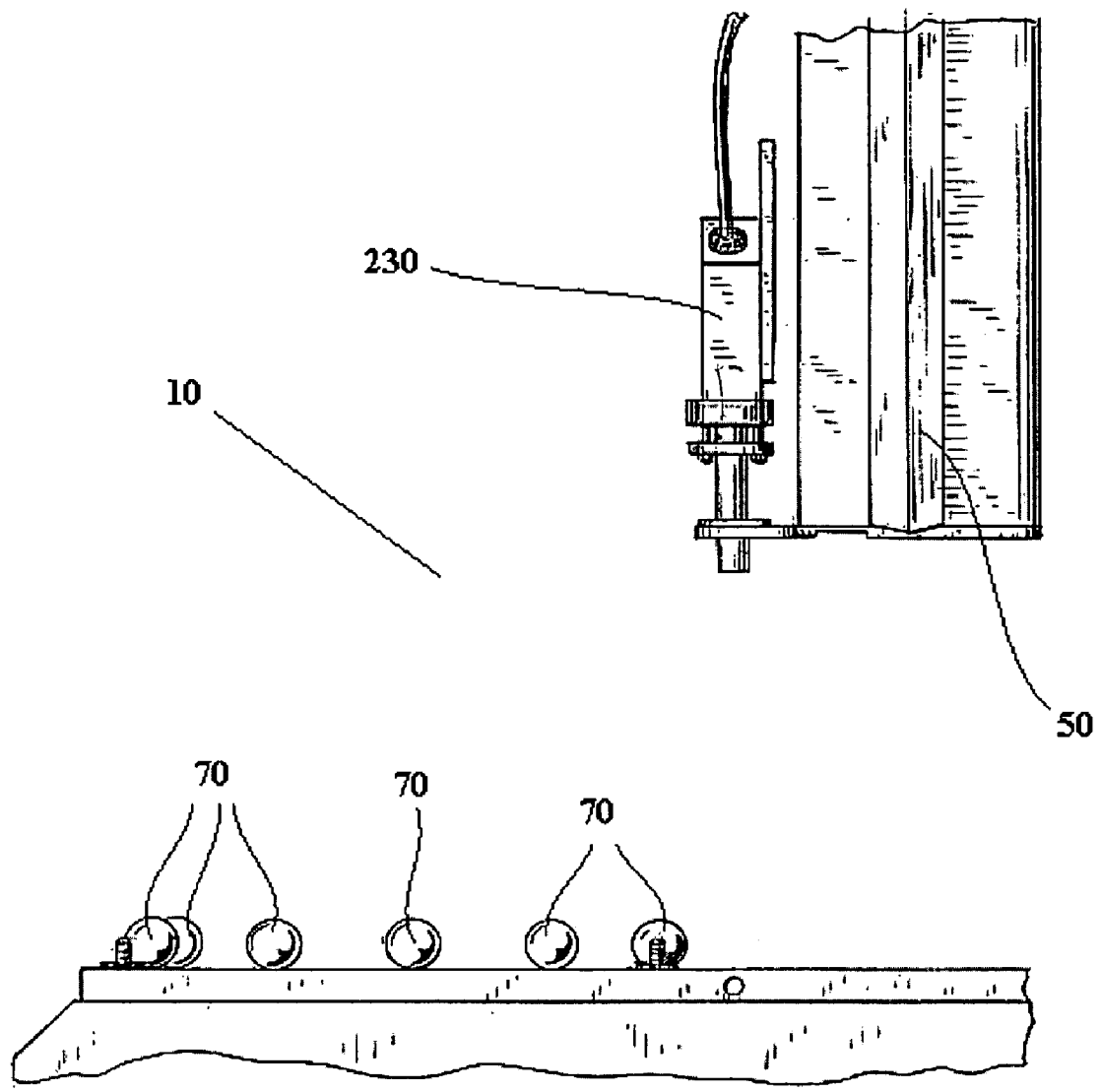
FIG. 1 is a perspective view of an alignment correction system.
Figure 2:
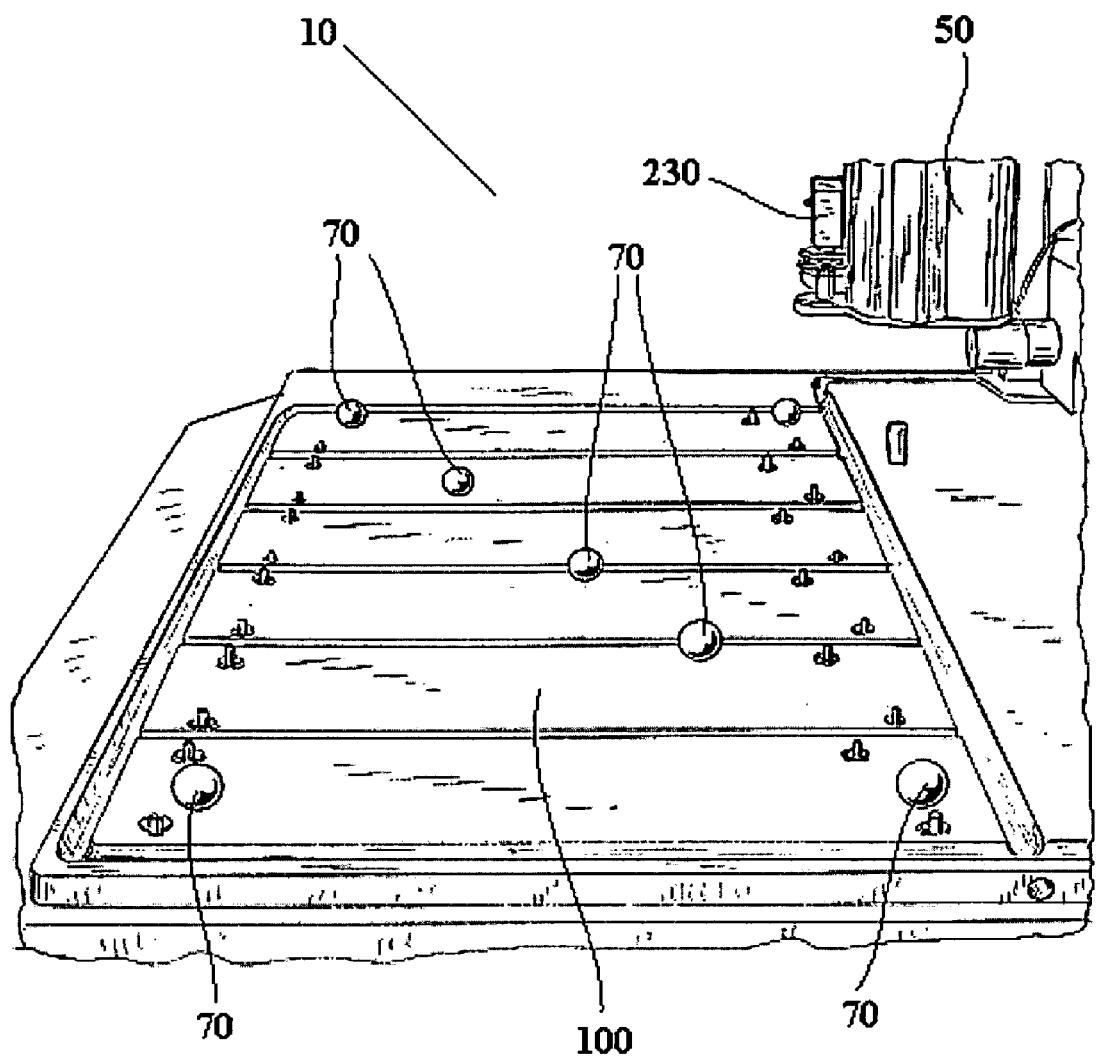
FIG. 2 is an orthographic view of an alignment correction system.

As shown in FIGS. 1 and 2, the alignment correction system 10 of the present invention, has a Cartesian robot arm 50, or equivalently, an X-Y plotter, mounted in such a way that it is vertically disposed above a base (i.e. bed) 100, both the robot and base occupying substantially parallel planes.

The surface of the base has a series of holes or depressions in which light-reflective objects 70 may be positioned. Each of the holes or depressions is referred to as a reference point, or equivalently, a target location. As used in the present application, light-reflective objects may include spheres. Light-reflective spheres of the present invention may include spheres or parts of spheres that reflect light. Suitable light-reflective spheres for use in alignment correction systems of the invention include commercially available stainless steel, titanium, silicon carbide, tungsten carbide, or ceramic ball bearings; other metal-coated spheres such as, but not limited to, spheres made of glass, plastic, wood, ceramics, or stone; and other reflective convex surfaces such as mirrors and glass. The light-reflective spheres need not be full spheres; they may be hemi-spherical or less, so long as light can be reflected from the sphere, or part of a sphere, and so long as the apex of the sphere can be determined.

The base, in addition to being the location of the reference points, may also be a holder for racks such as test tube holders, micro-titer plates, or any rack or holder for single or multiple samples. The robot or plotter may also have a Z-coordinate control; however the Z-coordinate control is not vital to aligning the apparatus above specific points on the base.

The Cartesian robot of the alignment correction system, is part of an X-Y actuator adapted to move to any X-Y coordinate above the base surface. The Cartesian robot may have a probe attached through which a material may be delivered to the base or to a rack associated with the base. The probe may be a delivery probe that may be designed to deliver solid materials that are picked up at one location and deposited at another location, or the robot and probe may be designed to deliver liquid materials to the base or to a rack associated with the base.

The alignment correction system can also have a light source and a sensor 230 on the Cartesian robot. In some embodiments the light source may be a laser light source. The light source and sensor may be an alignment probe that is removably or permanently attached to the Cartesian robot, or the light source and sensor may be mounted in place of a delivery probe, which may then be reattached once the alignment procedure is complete. The light source and sensor is positionable within a plane that is substantially parallel to the base plane, at a distance from the base plane such that the laser can illuminate each target location with a beam of light and the sensor can detect reflected light from any light-reflective object located on or near the base. The laser beam is positioned substantially perpendicular to the plane of the base.

The light source and sensor may be combined into a single unit, such as a retro-reflective laser optic sensor, or other retro-reflective light optic sensor. A retro-reflective laser optic sensor has both a lasing source and a laser sensor. The lasing source produces a laser beam that when shone against a reflective surface will be reflected back to the sensor that then detects the presence of the reflected laser beam and also measures the intensity of the reflected laser beam. Arrangements of this type are commercially available and are readily adaptable to attachment to an X-Y plotter or Cartesian robot assembly. Commercial sources include, but are not limited to: the LV-Series laser optic sensors from Keyence International (Woodcliff Lake, N.J.), scanCONTROL and optoN-CDT series laser sensors from Micro-Epsilon (Raleigh, N.C.), and coaxial retro-reflective type laser sensors (e.g. LS-H91F) from Matsushita/Panasonic group, Aromat Corporation (New Providence, N.J.).

As used in the present invention, "substantially parallel" or "substantially perpendicular" is intended to describe, within the tolerance of the system, alignment between objects that are intended to be parallel or perpendicular, but which, due to the variation in normal manufacture or other outside forces, are not perfectly parallel or perpendicular. Hence, it is to be understood that an alignment is substantially parallel or substantially perpendicular when any variation from perfectly parallel or perpendicular does not adversely impact the method of aligning the system as a whole. For example, as one of skill in the art would understand, the case of having the parallel planes of the robot and base off by 5° when they are only disposed from each other by a few inches may be perfectly acceptable, however if they are disposed from each other by a few feet, 5° off may not be acceptable. In the case of substantially perpendicular, if a positional error of 1 mm is tolerable, then it may be desirable that a motion of 100 mm be accurate to within +/−0.5°. Therefore, substantially parallel or substantially perpendicular need to be assessed for each particular system manufactured, with the intent that the items be perpendicular or parallel, but a certain number of degrees variation from parallel or perpendicular placement may be tolerated.

As described above, for each Cartesian robot manufactured, the offset, scale inaccuracy, and skew errors may need to be determined individually, or two or all three of the errors may need to be determined. The equations for error correction may be represented as:

$$X' = K_1 + (K_2 * X) + (K_3 * Y)$$

$$Y' = K_4 + (K_5 * Y) + (K_6 * X)$$

The six constants, $K_1$ through $K_6$, must be found experimentally for each machine produced. $K_1$ and $K_4$ correct for offset error, $K_2$ and $K_5$ correct for scale inaccuracy, and $K_3$ and $K_6$ correct for skew error. In these equations, the X and Y terms represent the requested location of the probe, while X' and Y' represent the actual location achieved. Multiple regression analysis may then be performed to determine the proper error correction coordinates. For computational methods for multiple regression analysis, see Irwin Miller and John E. Freund, *Probability and Statistics for Engineers* § 12.4, at 245–254 (Dr. Albert A. Bennett ed., 1965). *Probability and Statistics for Engineers* is herein incorporated by reference in its entirety for all purposes not inconsistent with the disclosed invention.

In order to find the proper values for these constants, the locations of each reference point, or target location, in a set of reference points, must be determined accurately. These reference points should be accurately aligned with the features of the Cartesian robot bed, or the base, that hold the racks or tasks that the robot is supposed to address. To ensure that the reference points are accurately placed, they can be manufactured into the base, or may be part of a grid that is associated with the base in such a manner that the position of the reference points relative to the robot arm is reproducible every time the grid is attached to the base. This can be accomplished through machining, punching, tapping, or other manner of placing the reference points and features into the same position on the bed every time the error correction factors need to be determined.

Figure 3:
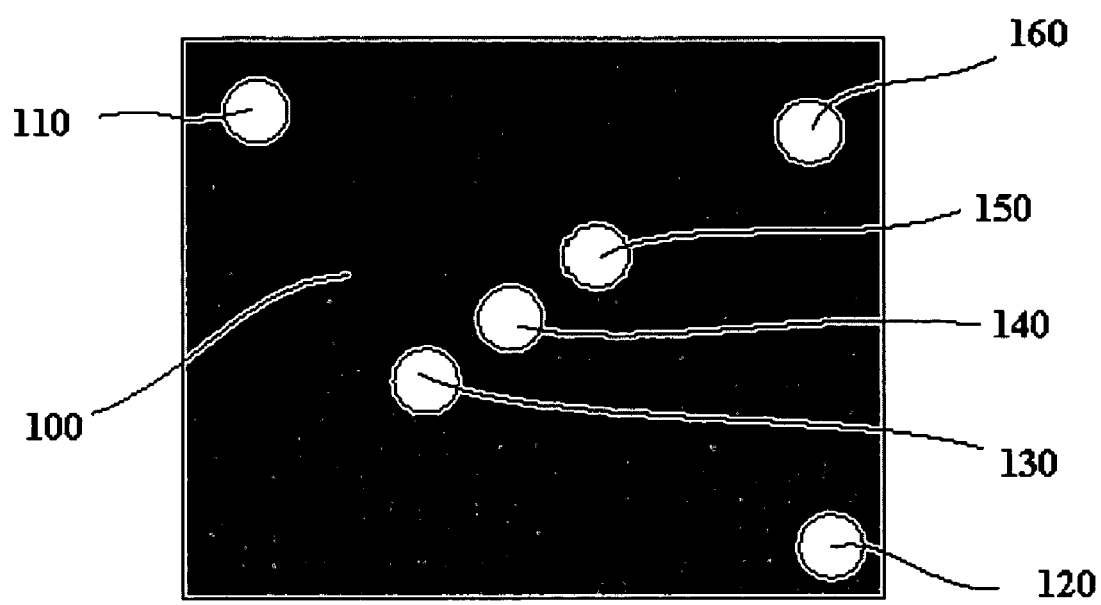
FIG. 3 is a depiction of one possible arrangement of light-reflective spheres.

One possible arrangement of reference points, relies on holes, depressions, or circular pockets cut into the bed. The centers of these holes are placed accurately in locations that allow the correction constants to be calculated. FIG. 3 shows just one of many possible arrangements of holes, depressions, or circular pockets, on the bed 100. To accurately determine the correction factors, the reference points advantageously include, but do not require, two reference points 110, 120 placed diagonally at opposite sides of the work space. Information generated from these reference points contributes to scale inaccuracy constant calculation. Other reference points 130, 140, 150 may be placed at locations near the center of the work area, along the opposite diagonal. Information generated from these reference points contributes primarily to the accuracy of the offset error constants, $K_1$ and $K_4$. Another reference point 160 may be placed at a third corner of the work space and helps to establish the skew correction constants accurately. As FIG. 3 shows, it is desirable, though not necessary, to pick these locations for the reference points such that no two X coordinates, or no two Y coordinates are the same. The number of reference points, and/or their exact placement, may vary depending upon a number of factors including the type or size of the apparatus or the intended application. It is well within the understanding of the skilled artisan to select the appropriate number and placement of the reference points based on the disclosure herein.

With the Cartesian robot system prepared as described in detail above, the method described below may be used to correct for alignment errors. The method of the invention has several steps, including:

(1) positioning the retro-reflective light source and sensor of the alignment correction system over one of the light-reflective objects at one of the target locations;

(2) illuminating the light-reflective object with a beam of light;

(3) detecting the light reflected from the light-reflective object with the sensor;

(4) repositioning the light source and sensor relative to the light-reflective object until the reflected light is at a maximum and recording the position of the light source and sensor at the maximum; and (5) repeating the above steps for each target location having a light-reflective object, and determining the alignment error from the data gathered in step 4. The alignment error may be one or more of offset error, scale inaccuracy, or skew.

As part of the method, once the reference points are placed accurately in, or on, the bed or base as described above, the apparent position of those locations may be measured by placing light-reflective objects at each location on the base. In some embodiments, the light-reflective object(s) is a light-reflective sphere. When the light-reflective object is a sphere, and the light-reflective sphere is placed in a hole or depression, the apex of the sphere will automatically be located at the center of the hole or depression. The apex of the sphere being located at the center of the hole or depression is known as self-centering. To aid in the self-centering of the light-reflective sphere, the diameter of the hole or depression may be the same as the diameter of the light-reflective sphere. Alternatively, the diameter of the hole or depression may be less than that of the light-reflective sphere, such that the bottom of the sphere does not touch the bottom of the hole or depression but is suspended in the hole by the rim of the hole. In either case, the light-reflective sphere is optionally restricted from movement so that the reference point may be accurately determined. Because light-reflective spheres are self-centering, they may be placed rapidly and accurately by hand onto the bed. Specialized tools or other placement apparatuses are not required. However, it is also contemplated that the base may have holes for receiving a peg, screw, or other attachment means for the spheres, the peg or screw having a rounded, spherical top, or hemi-sphere performing the same function as a full sphere. Other spherical shapes that may be used are arcs of a sphere that may be mounted in or on the base. Again, the spheres, hemi-spheres, or arcs may be any convex surface that is reflective.

Once the reflective spheres 70 are placed on the base 100 (FIG. 4), and centered upon a hole 215, or depression, a light source and sensor, or retro-reflective laser optic sensor 230, may be mounted on the robot actuator in a way that can be compared to the eventual tool use. In other words, the retro-reflective laser optic sensor 230 may be mounted at substantially the same location as a delivery probe would be or is located.

Figure 4:
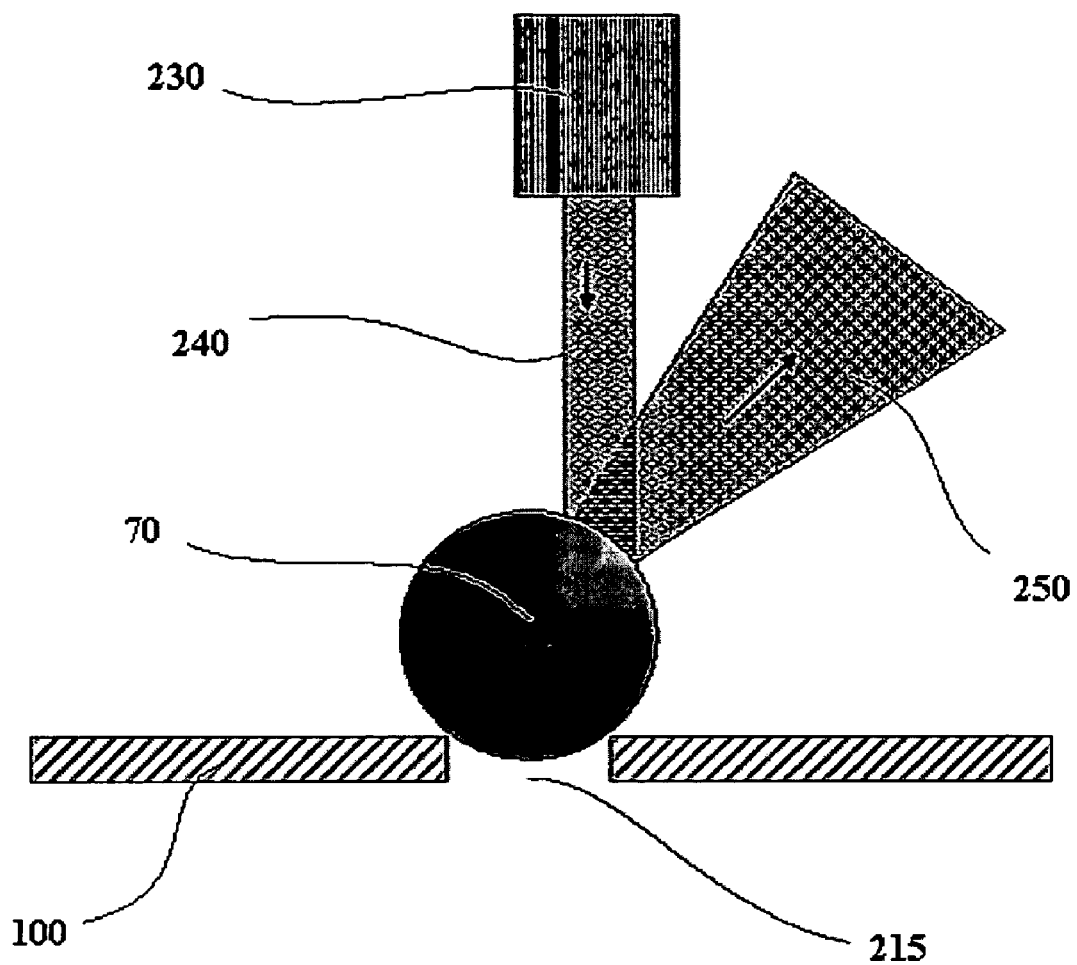
FIG. 4 is a depiction of a laser and light-reflective sphere center that are not in alignment.
Figure 5:
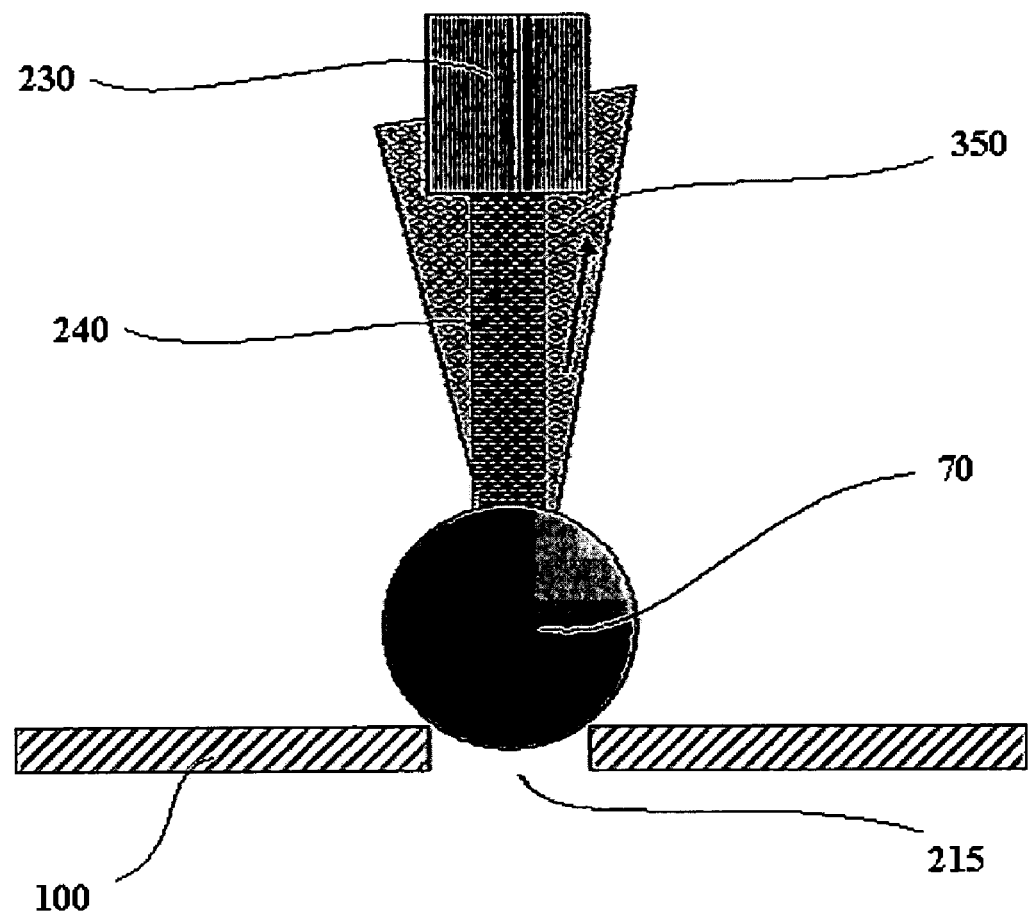
FIG. 5 is a depiction of a laser and light-reflective sphere center that are in alignment.
Figure 6:
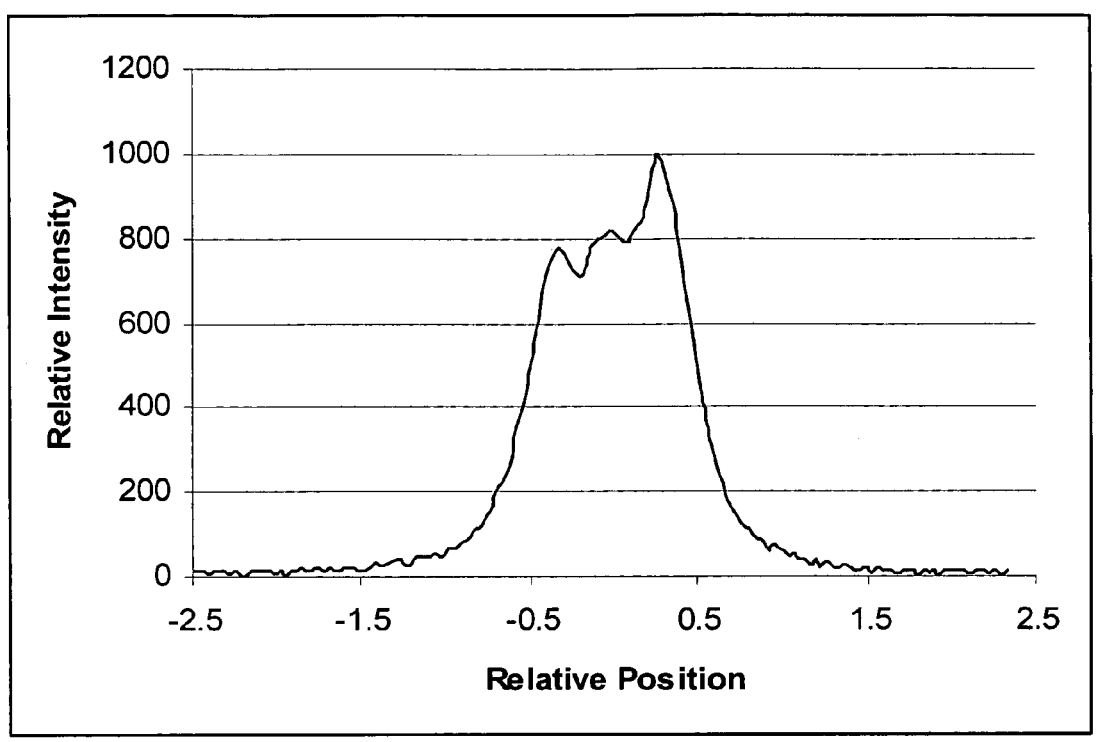
FIG. 6 is a graph of the reflected light intensity as a function of position as the laser scans across the center of a light-reflective sphere.

The reference point location is determined by locating the apex of each light-reflective object as shown in FIGS. 4, 5, and 6. This may be achieved by directing the laser beam 240 down toward the sphere and along the same path that the probe would travel. Usually, the initial beam position will not be accurately aligned with the reference center, or apex of the reflective sphere. The result is that the laser beam is reflected away 250 from the sensor, and the sensor would report a small amount of reflected light indicating that the beam is not on target. As the laser beam is scanned across the surface of the reflective sphere, maxima and minima of reflective light are determined. FIG. 4. When a maxima is found, the retro-reflective laser optic sensor is then scanned in a second direction, along that maxima center line, perpendicular to the direction of the first scan, to find the reflection maxima in that second direction, until the laser beam 240 is brought into alignment 350 with the laser optic center. FIG. 5. In this case, the maximum amount of light is returned to the sensor and the apex of the reflective sphere is thus located.

FIG. 6 is an illustration of a scan across the center of the reflective sphere. The amount of light reflected is shown as a function of the travel path of the probe. The sensor detects a minima of light at the extremes and is saturated at the center, or apex, of the light-reflective sphere.

In some embodiments, determining the location of a single reference point may be sufficient to determine correction factors for one source of error. In other embodiments more than one reference point may be located to determine correction factors for one or more sources of error. In still other embodiments, two, three, four, or more reference points may be located to determine correction factors for all sources of error.

Figure 7:
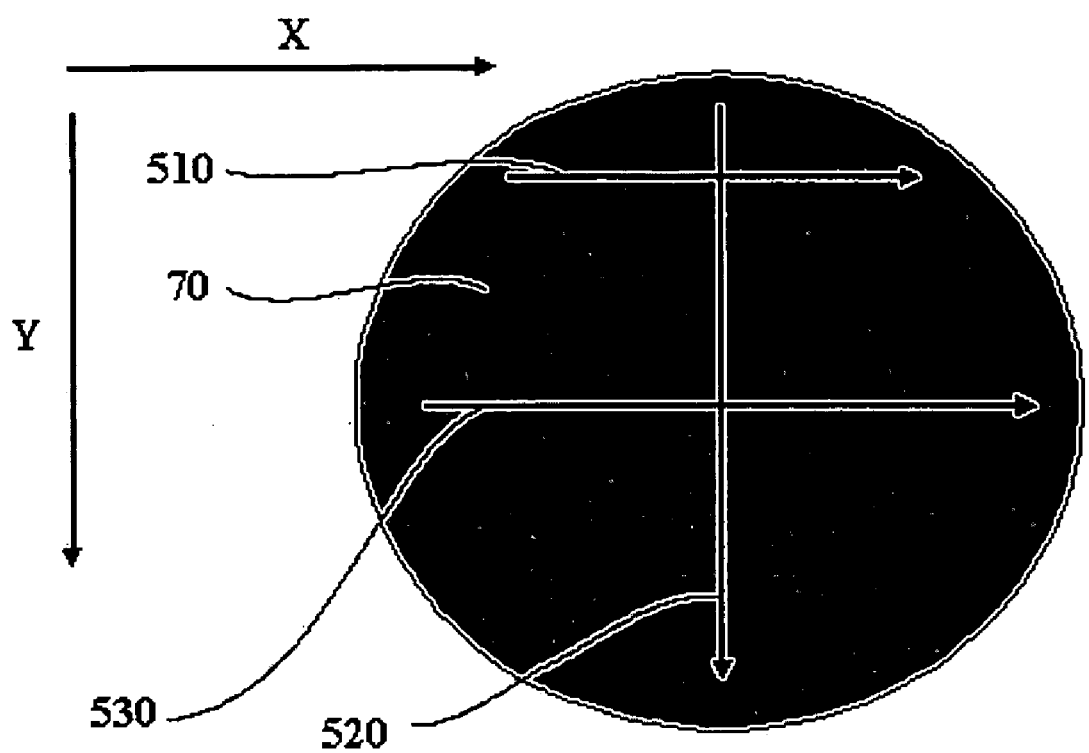
FIG. 7 is a depiction of three scan directions for position location.

Typically, scans are done in three passes. FIG. 7. First a rough scan in an X-direction 510 is done to locate the approximate center line of the sphere. On this center line, a scan is done in a Y-direction 520, which finds the Y center. Using the Y center, the X-direction scan 530 is repeated, giving a more accurate X center value. The more accurate X center line is a result of the iterative scan process to more narrowly approximate the true center of the sphere 70 in terms of both X and Y. The iterations could be performed several times, each scan iteration resulting in a slightly more accurate reading of the X or Y center lines than were determined in the previous iteration. Of course, the definitions of the X and Y directions are arbitrary and one of skill in the art would immediately recognize that the three scan iterations may be done in Y first, then X, then Y. As a final step in the method, all reference point locations may then be scanned to give a full set of X and Y measurements for those known reference point locations, for determining the alignment error. Multiple linear regression, of the positions at which the light-reflective spheres were located, may then be used to determine the correction factors ($K_x$).

The systems and methods of the present invention offer safety advantages. For example, the surface of a ball bearing is strongly convex, and can cause the laser light to diverge. Because of this effect, stray reflected laser light is likely to be safer for human sight than laser light reflected from, e.g., a flat surface. Also, the laser used may be of low enough power so as not to present a safety risk.

The invention has been described with reference to various specific and illustrative embodiments. However, it should be understood that many variations and modifications may be made while remaining within the spirit and scope of the invention.

We claim:

1. An alignment correction system comprising
(a) a base having a surface with one or more target locations, wherein each target location is fitted to receive a light-reflective object and all of the target locations lie substantially in a single base plane;

(b) one or more light-reflective objects, each positioned at one of the target locations; and (c) a probe having a light source and a sensor to detect reflected light, the probe being positionable within a probe plane substantially parallel to the base plane and at a distance from the base plane such that the probe can illuminate each target location with a beam of light and the sensor can detect reflected light from any light-reflective object located at such target location.

2. The alignment correction system of claim 1, wherein the light source is a laser.

3. The alignment correction system of claim 1, wherein the light-reflective object is a light-reflective sphere.

4. The alignment correction system of claim 1 wherein the beam of light is substantially perpendicular to the base plane.

5. The alignment correction system of claim 1 wherein the surface of the base comprises a depression or hole for containing a light reflective object at each target location.

6. The alignment correction system of claim 1 wherein a light reflective object is positioned at each target location.

7. The alignment correction system of claim 1 wherein the target positions on the base surface are defined by an x-coordinate and a y-coordinate such that no two target locations have the same x-coordinate or the same y-coordinate.

8. The alignment correction system of claim 1 wherein the base surface comprises at least two pairs of corners, and the corners of each pair are diagonally positioned from each other.

9. The alignment correction system of claim 8 wherein at least two target locations are positioned along a first diagonal that extends between opposite corners of the base surface.

10. The alignment correction system of claim 9 wherein two or more target locations are positioned on a second diagonal extending between a second pair of opposite corners on the base surface and wherein the target locations are positioned in the center region of the base surface.

11. The alignment correction system of claim 10 wherein at least one target location on the second diagonal is positioned on the same side of the base surface as one of the target locations positioned on the first diagonal.

12. The alignment correction system of claim 1 wherein the base is adapted to hold containers for receiving liquids.

13. The alignment correction system of claim 12 wherein the containers for receiving liquids are selected from racks of test tubes or microtiter plates.

14. The alignment correction system of claim 1 wherein the alignment correction system is part of an X-Y plotter or a Cartesian robot, each having an X-Y actuator adapted to move to any X-Y coordinate above the base surface.

15. The alignment correction system of claim 14 wherein the Cartesian robot is a liquid handling robot.

16. The alignment correction system of claim 14 wherein the probe is mounted on the X-Y actuator.

17. The alignment correction system of claim 3 wherein the light reflective sphere is selected from a ball bearing, a metal coated sphere, a ceramic sphere, a reflective glass sphere, or a reflective plastic sphere.

18. The alignment correction system of claim 2 wherein the probe is a retro-reflective laser optic sensor.

19. A method of correcting alignment errors in a machine using the alignment correction system of claim 1 comprising:

(a) illuminating the one or more light-reflective objects with the beam of light from the probe of the alignment correction system; and (b) detecting the light reflected from the one or more light-reflective objects with the probe sensor.

20. A method of correcting alignment errors in a machine comprising:

(a) positioning the probe of the alignment correction system of claim 1 over one of the light-reflective objects at one of the target locations;

(b) illuminating the light-reflective object with a beam of light from the probe light source;

(c) detecting the light reflected from the light-reflective object with the probe sensor;

(d) repositioning the probe relative to the light-reflective object until the reflected light is at a maximum and recording the position of the probe at the maximum;

(e) repeating the above steps for each target location having a light-reflective object thereat; and (f) determining the alignment error from the data gathered in step (d).

21. The method of claim 20 wherein the alignment error is one or more of offset error, scale inaccuracy, or skew.

22. The method of claim 20 wherein the probe is positioned to scan a center line of each light reflective object.

23. The method of claim 21 wherein a center line along the x-axis and a center line along the y-axis are both scanned.

24. The method of claim 22 wherein a scan along the x-center line is performed; a y-center line is scanned from the x-center line; and from the y-center line the x-center line is again scanned.

25. The method of claim 22 wherein the center line along the x-axis and the center line along the y-axis provide a set of X and Y measurements for each target location.

26. The method of claim 24 wherein multiple linear regression is performed on the set of X and Y measurements for each target location.

27. An alignment correction system comprising (a) a Cartesian robotic arm further comprising a probe;

(b) a base having a surface with one or more target locations, wherein each target location is fitted to receive a light-reflective sphere and all of the target locations lie substantially in a single base plane, and further wherein the robot arm and the base are vertically disposed from one another and occupy substantially parallel planes;

(c) one or more light-reflective spheres, each positioned at one of the target locations;

(d) wherein the probe further comprises a laser and a sensor to detect reflected laser light, the probe being positionable within a probe plane substantially parallel to the base plane and at a distance from the base plane such that the probe can illuminate each target location with a beam of laser light and the sensor can detect reflected light from any light-reflective sphere located at such target location.

* * * * *